(12) United States Patent
Lobo

(10) Patent No.: US 9,755,790 B2
(45) Date of Patent: Sep. 5, 2017

(54) DETECTING PRESENCE/ABSENCE OF AN INFORMATION SIGNAL

(75) Inventor: Nativadade Albert Lobo, Berkshire (GB)

(73) Assignee: Core Wireless Licensing S.a.r.l., Luxembourg (LU)

( * ) Notice: Subject to any disclaimer, the term of this patent is extended or adjusted under 35 U.S.C. 154(b) by 1156 days.

(21) Appl. No.: 11/991,861

(22) PCT Filed: Sep. 11, 2006

(86) PCT No.: PCT/IB2006/002586
§ 371 (c)(1),
(2), (4) Date: Mar. 2, 2009

(87) PCT Pub. No.: WO2007/034288
PCT Pub. Date: Mar. 29, 2007

(65) Prior Publication Data
US 2009/0222401 A1  Sep. 3, 2009

(30) Foreign Application Priority Data
Sep. 19, 2005 (GB) .................................. 0519051.7

(51) Int. Cl.
*H04L 1/20* (2006.01)
*H04B 17/26* (2015.01)

(52) U.S. Cl.
CPC .............. *H04L 1/20* (2013.01); *H04B 17/26* (2015.01)

(58) Field of Classification Search
None
See application file for complete search history.

(56) References Cited

U.S. PATENT DOCUMENTS

| 5,323,337 A | * | 6/1994 | Wilson et al. ................... 702/73 |
| 5,884,255 A | * | 3/1999 | Cox .............................. 704/233 |
| 7,428,270 B1 | * | 9/2008 | Dubuc et al. ................. 375/316 |
| 2002/0176516 A1 | | 11/2002 | Jeske et al. |
| 2004/0028124 A1 | | 2/2004 | Nuutinen et al. |

FOREIGN PATENT DOCUMENTS

| CN | 1230276 A | 9/1999 |
| CN | 1305294 A | 7/2001 |
| JP | 2010503297 T | 3/1998 |
| JP | 2004356725 A | 12/2004 |
| JP | 2005225761 A | 8/2005 |
| WO | 03/025513 A2 | 3/2003 |
| WO | 2005/005546 A1 | 6/2005 |

OTHER PUBLICATIONS

Barkat et al., Signal Detection and Estimation, 2005, Artech House Inc, 2nd Edition, pp. 101-115.*
EP Search Report and Office Action for corresponding EP Patent Application No. 0679552 issued Mar. 26, 2012.
CN Office Action for corresponding CN Patent Application No. 200680034317.0 issued May 11, 2012.

* cited by examiner

*Primary Examiner* — Paulinho E Smith
(74) *Attorney, Agent, or Firm* — Core Wireless Licensing Ltd.

(57) ABSTRACT

A method and apparatus for detecting the presence of an information signal in received inputs. Inputs are received and an expected variance of the received inputs is determined based on an assumed statistical distribution of power values. Using the determined expected variance of the received inputs, a first hypothesis is tested that the received inputs include an information signal to detect a presence of the information signal.

17 Claims, 2 Drawing Sheets

DETECTING PRESENCE/ABSENCE OF AN INFORMATION SIGNAL

FIELD OF THE INVENTION

Embodiments of the present invention relate to detecting presence/absence of an information signal.

BACKGROUND TO THE INVENTION

It is desirable to detect from values x[t] the presence/absence of an information signal s[t] within 'noise' n[t] i.e. whether x[t]=n[t] or x[t]=s[t]+n[t].

This may be difficult if the signal to noise ratio s[t]/n[t] is small. It also becomes difficult to find a single algorithm that can deal with large ranges of signal to noise ratio.

BRIEF DESCRIPTION OF THE INVENTION

According to one embodiment of the invention there is provided a method comprising: receiving inputs; determining an expected variance of the inputs; and testing a first hypothesis that the inputs include a signal.

According to another embodiment of the invention there is provided a decision engine comprising: means for determining an expected variance of received inputs; and means for testing a first hypothesis that the inputs include a signal.

According to another embodiment of the invention there is provided a computer program comprising computer program instructions which when loaded into a processor enable the processor to: determine an expected variance of received inputs; and test a first hypothesis that the inputs include a signal.

According to another embodiment of the invention there is provided a detector comprising: means for determining an expected variance of received inputs; and means for testing a first hypothesis that the inputs include a signal to detect a signal.

BRIEF DESCRIPTION OF THE DRAWINGS

For a better understanding of the present invention reference will now be made by way of example only to the accompanying drawings in which.

DETAILED DESCRIPTION OF EMBODIMENTS OF THE INVENTION

Figure 1:
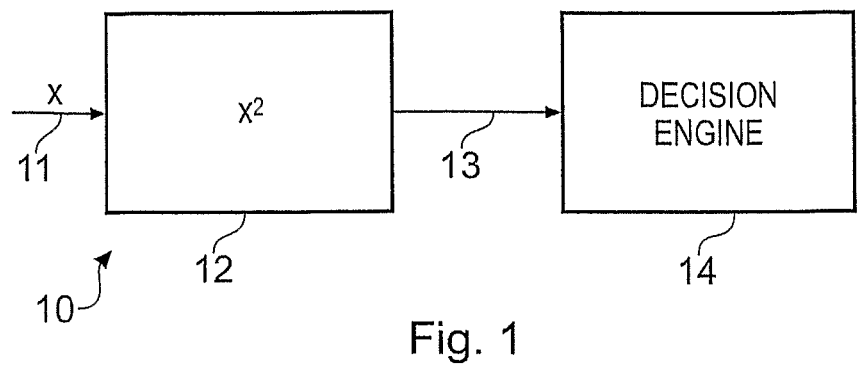
FIG. 1 schematically illustrates an apparatus.

FIG. 1 schematically illustrates an apparatus comprising circuitry 10 for detecting from values x[t] the presence/absence of an information signal s[t] within noise n[t] i.e. whether x[t]=n[t] or x[t]=s[t]+n[t].

The circuitry 10 receives as an input value 11 a series of values $x[t_0], x[t_1], x[t_2] \ldots x[t_{m-1}] x[t_m]$. The generalised, nth value $x[t_n]$, will be referred to as $x_n$.

A power converter 12 squares the input value $x_n$ to produce $x_n^2$, the nth power value 13, which is provided to a decision engine 14. The input value $x_n$ may be a multidimensional value e.g. $x_n = \{y_1, y_2, y_3 \ldots y_j\}$, where j=1, 2 ... or m in which case the power value $p_n = y_1^2 + y_2^2 + y_3^2 + \ldots + y_j^2$. The power value $p_n$ may be used to represent the absolute value of a complex signal I+jQ.

Figure 2:
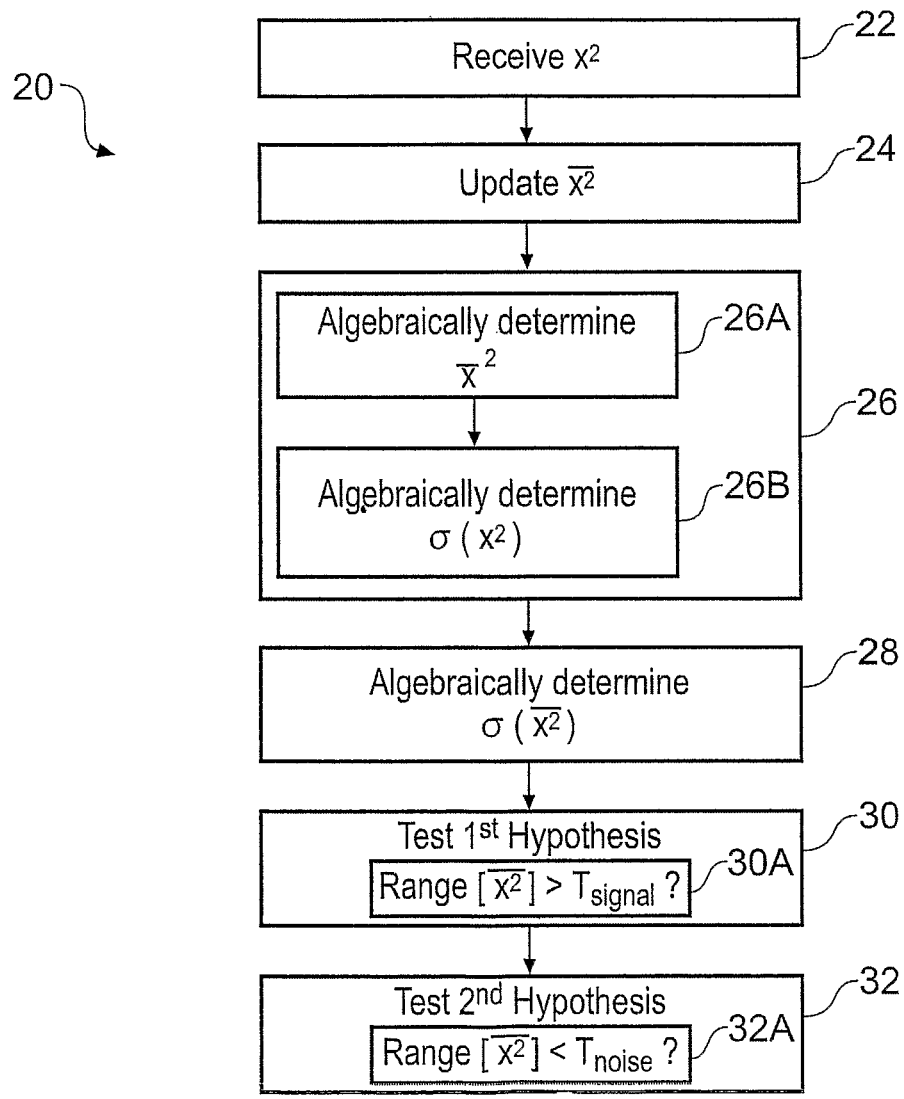
FIG. 2 schematically illustrates a decision method.

The decision engine 14 performs the method 20 schematically illustrated in FIG. 2.

The decision engine 14 uses algebraic processing based upon an assumed statistical distribution of the power values 13.

It is assumed that the power values $x_n^2$ 13 have a non-central Chi squared distribution.

A consequence of this assumption is that a number of algebraic relationships result that relate the mean of the input values ($x_n$), the mean of the power values ($x_n^2$) and the variance of the power values ($x_n^2$). The algebraic relationships are:

The noise is assumed to have a power of 1. Then
a) The mean of the power values equals one plus the square of the mean of the input values 11 i.e.

$$\text{mean}(x_n^2) = 1 + \text{mean}(x_n)^2 \qquad \text{Equation 1}$$

b) The variance of the power values equals two plus four times the square of the mean of the input values 11 i.e.

$$\text{variance}(x_n^2) = 2 + 4*\text{mean}(x_n)^2 \qquad \text{Equation 2}$$

The method 20 comprises a sequential series of blocks which may represent steps in a process or portions of a computer program.

At block 22, the decision engine 14 receives the latest power value $x_n^2$ 13.

Next, at block 24, the decision engine 14 uses the latest power value $x_n^2$ to update a value for mean($x^2$). In this example, it uses an algorithm that the latest mean of the power values equals the total cumulative sum of the power values, including the latest power value, divided by the number of power values included in that sum i.e.

$$\text{mean}(x_n^2) = ((n-1)*\text{mean}(x_{n-1}^2) + x_n^2)/n$$

Next at block 26, the decision engine 14 uses the latest mean of the power values to determine the expected variance in the power values using Equations 1 and 2. It should be noted that this step is based upon the algebraic equations determined having assumed a certain statistical distribution rather than a brute force calculation of the variance.

First at sub-block 26A, the decision engine 14 uses the mean ($x_n^2$) value to algebraically determine mean($x_n$)$^2$ using Equation 1.

$$\text{mean}(x_n)^2 = \text{Max}[0, \text{mean}(x_n^2) - 1]$$

Then at sub-block 26B the decision engine 14 uses mean($x_n$)$^2$ to algebraically determine variance($x_n^2$) using Equation 2.

$$\text{variance}(x_n^2) = \text{variance}(x_{n-1}^2) + 2 + 4*\text{mean}(x_n)^2$$

Alternatively, at block 26, the decision engine 14 could use mean ($x_n^2$) value to algebraically determine variance ($x_n^2$) directly $$\text{variance}(x_n^2) = \text{variance}(x_{n-1}^2) + 4*\text{mean}(x_n^2) - 2$$

Next at block 28, the decision engine 14 uses the expected variance in the power values to determine algebraically the expected variance in the mean of the power values.

$$\text{variance}(\text{mean}(x_n^2)) = \text{variance}(x_n^2)/n$$

Hypothesis—Input Value Includes Signal

Next at block 30, the decision engine 14 tests a first hypothesis that the input values include an information signal.

The range of probable values for mean($x_n^2$), if it includes a signal, may be expressed as:

$$\text{mean}(x_n^2) +/- \text{Factor}*[\text{variance}(\text{mean}(x_n^2))]^{1/2}$$

or its equivalent expression $$\text{mean}(x_n^2) +/- \text{Factor}*[\text{variance}(x_n^2)/n]^{1/2}$$

The decision engine 14, at sub-block 30A, determines whether that range lies above a threshold $T_{signal}$. For example, if mean($x_n^2$)−Factor*[variance $(x_n^2)/n]^{1/2} > T_{signal}$ then the input values 11 can be assumed to include an information signal.

"Factor" represents the number of standard deviations from the mean. It may in some embodiments be a constant Real number F. It other embodiments, "Factor" may be a function of n such that the value of Factor becomes smaller as n increases. This has the consequence that the text for a signal becomes less stringent as n increases.

For example, Factor may have a value $F/n^\alpha$ where $0.45 \leq \alpha \leq 0.55$. This includes the special case of $\alpha=0.5$ which results in Factor having the value $F/n^{1/2}$ The Threshold $T_{signal}$ may in some embodiments be a constant Real number. It other embodiments it may be dependent upon an upper boundary of the range of probable values for mean($x_n^2$), if it does not include a signal i.e.

$$T_{signal} = 1 + F[2/n]^{1/2}$$

where the range of probable values for mean($x_n^2$), if it does not include a signal, may be expressed as:

$$\text{mean}(x_n^2) +/- \text{Factor}*[\text{variance}(x_n^2)/n]^{1/2}$$

which reduces to $$\text{mean}(x_n^2) +/- F*[2/n]^{1/2}$$

as variance($x_n^2$)=2 for a noise signal, from Equation 2, as mean($x_n$) is zero for such a signal.

The simplicity of the threshold $T_{signal}$ used reduces the complexity of the method 30.

Hypothesis—Input Value does not Includes Signal

If a decision cannot be made a block 30, the method moves to block 32 where the decision engine 14 tests a second hypothesis that the input values do not include an information signal.

The range of probable values for mean($x_n^2$), if it does not include a signal, may be expressed as:

$$\text{mean}(x_n^2) +/- F*[2/n]^{1/2}$$

The decision engine 14, at sub-block 32A, determines whether that range lies below a threshold $T_{noise}$. For example, if mean($x_n^2$)−$F*[2/n]^{1/2} < T_{noise}$ then the input values 11 can be assumed not to include an information signal.

$T_{noise}$ may be set to a constant such as the expected mean($x_{n+1}^2$) if there is no signal i.e. 1 from Equation 1.

The simplicity of the threshold $T_{noise}$ used reduces the complexity of the method 30.

The method 30 may be performed for each input value 11 received. A decision may therefore be made at the earliest possible opportunity. The confidence in the decision may be substantially independent of the signal to noise ratio.

The method 30 as described previously is carried out in decision engine 14. The decision engine 14 may be implemented in any suitable way, for example, as hardware or as computer program instructions implemented as firmware or software.

A hardware implementation may be dedicated circuits such as, for example, application specific integrated circuits (ASICs) or programmable circuits such as, for example, field programmable gate arrays (FPGAs).

Figure 3:
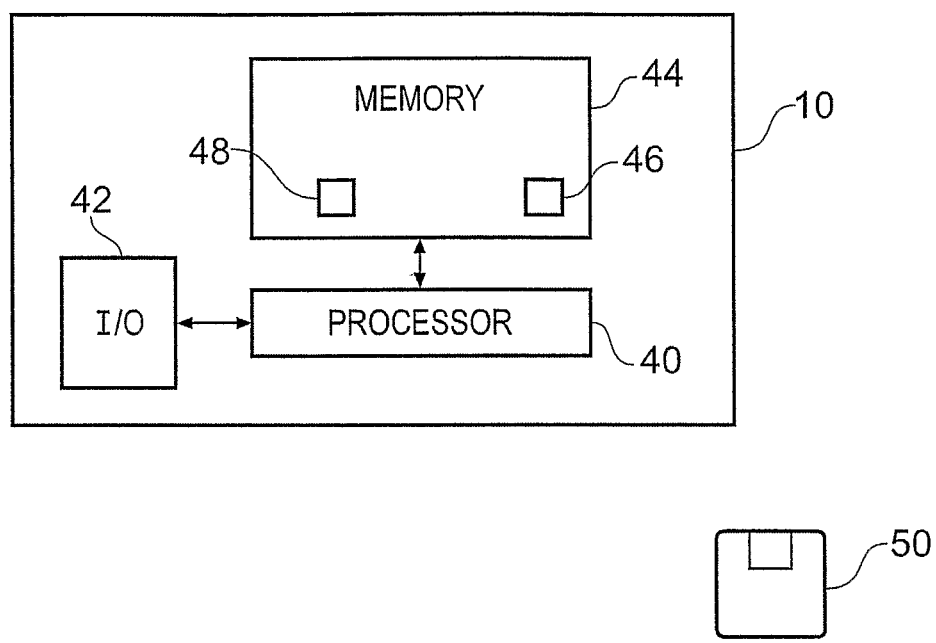
FIG. 3 schematically illustrates an implementation that uses computer program instructions.

FIG. 3 schematically illustrates an implementation that uses computer program instructions. A processor 40 is connected to a memory 44 and an input/output device 42. The processor 40 is arranged to receive input values 11 from the input/output device 42 and is arranged to read from and write to the memory 44.

The memory 44 stores a first computer program 46 which includes computer program instruction which when loaded in to the processor 40, enable the processor 14 to perform the functions of the power converter 12.

The memory 44 stores a second computer program 48 which includes computer program instruction which when loaded in to the processor 40, enable the processor 14 to perform the functions of the decision engine 14 i.e. the method 30.

The computer programs 46, 48 may arrive at the apparatus via an electromagnetic carrier signal or be copied from a physical entity 50 such as a computer program product, a memory device or a record medium such as a CD-ROM or DVD.

The invention has a large number of applications. In may be used in any application where it is necessary to detect from values x[t] the presence/absence of an information signal s[t] within noise n[t] i.e. whether x[t]=n[t] or x[t]=s[t]+n[t].

One application is in a code division multiple access (cdma) receiver. A particular example is in a satellite positioning receiver such as a global positioning system (GPS) receiver. In a GPS receiver a received signal may be correlated against a spreading code to detect the spreading code used to encode the received signal and/or to detect the phase offset of the spreading code which gives an indication of time of flight (pseudo range).

After correlation, the correlated signal is converted into a number of signals in the frequency domain. Each signal occupies a particular frequency range (frequency bin). For each frequency bin, the signal is coherently integrated (cumulatively summed), and then converted to a power value and summed (non-coherently integrated). The result of the non-coherent integration 13 may be processed by the decision engine 14 to identify the presence absence of a signal in that frequency bin. This allows frequency lock to be obtained.

Another application is detecting a clock signal in noise.

Another example application is processing the output from a plurality of sensors to determine which one, if any, of the sensors has detected a signal s[t].

Another example application, is processing the signal that is generated in a radio receiver when the receiver attempts to lock to the carrier frequency of transmission.

Although embodiments of the present invention have been described in the preceding paragraphs with reference to various examples, it should be appreciated that modifications to the examples given can be made without departing from the scope of the invention as claimed. The decision engine may be used for detection of a signal using a power value 13 created from any m-dimensional input value 11. It may be used when the variance of the power value, in the absence of a signal, has a quantifiable value that is different to the variance of the power value in the presence of a signal. It may be used when the mean of the input value, in the absence of a signal, has a zero value. It may be used when the signal s[t] is a cyclostationary random process with an expected mean of zero such as a signal than varies periodically between +S and −S such as a GPS satellite signal.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

I claim:

1. A method for detecting a presence of an information signal in a received signal, comprising:
   receiving an electrical signal;
   correlating the received signal with a spreading code;
   processing the correlated signal to produce a sequence of power values;
   for a most recent power value, updating a mean power value over a plurality of power values in the sequence;
   determining a range of mean power values defined by the updated mean power value bounded by a selected multiple of a variance of the plurality of mean power values according to a selected statistical distribution; and
   comparing the range of mean power values with a signal threshold value;
   wherein the presence of an information signal in the received signal is detected responsive to the comparing step indicating that the range of mean power values exceeds the signal threshold.

2. A method as claimed in claim 1, wherein determining the range of mean power values comprises:
   algebraically determining a mean of the square of input values corresponding to the correlated signal;
   algebraically determining an updated variance of the power values from the mean of the square of input values;
   algebraically determining a variance of the mean power values from the updated variance of the power values; and
   determining the range as the mean power value plus or minus a selected multiple of a square root of the variance of the mean power values.

3. A method as claimed in claim 1, wherein the statistical distribution is a chi-squared distribution of the power values.

4. A method as claimed in claim 1, wherein determining the range of mean power values comprises:
   updating a variance of power values from the updated mean power value; and
   algebraically determining a variance of the mean power values from the updated variance of the power values; and
   determining the range as the mean power value plus or minus a selected multiple of square root of the variance of the mean power values.

5. A method as claimed in claim 1, wherein the signal threshold is a constant.

6. A method as claimed in claim 1, wherein the signal threshold is dependent upon the upper boundary of the range of probable values for the mean of the inputs if they do not include a signal.

7. A method as claimed in claim 1, further comprising
   responsive to the comparing step indicating that the range of mean power values does not exceed the signal threshold, comparing the range of mean power values to noise threshold;
   wherein an absence of an information signal in the received signal is detected responsive to the comparing step indicating that the range of mean power values does not exceed the noise threshold.

8. A method as claimed in claim 7, wherein the noise threshold is a constant.

9. A method as claimed in claim 7, wherein the noise threshold is an expected mean of the inputs if there is no signal.

10. A method as claimed in claim 1, wherein the information signal is cyclostationary.

11. A method as claimed in claim 1, wherein the information signal has a mean of zero.

12. A non-transitory computer readable medium embodying a computer program comprising program instructions for causing a computer to perform the method of claim 1.

13. An apparatus comprising:
    a power converter configured to receive input signal values, and process the received input signal values to provide a sequence of power values; and
    processing circuitry, for detecting presence of an information signal within a received signal corresponding to the input signal values, configured to
    for a most recent power value, update a mean power value over a plurality of power values in the sequence;
    determine a range of mean power values defined by the updated mean power value bounded by a selected multiple of a variance of the plurality of mean power values according to a selected statistical distribution; and
    compare the range of mean power values with a signal threshold value;
    wherein the presence of an information signal in the received signal is detected responsive to the range of mean power values exceeding the signal threshold.

14. An apparatus as claimed in claim 13 wherein the operation of the processing circuitry is controlled by computer program instructions.

15. An apparatus as claimed in claim 13 wherein the processing circuitry is dedicated hardware.

16. An apparatus as claimed in claim 13, wherein the received input signal values correspond to correlations of Code Division Multiple Access radio signals with a spreading code.

17. An apparatus as claimed in claim 13, wherein the received input signal values are non-coherently integrated power values for received radio signals.

* * * * *